(12) United States Patent
Katchan et al.

(10) Patent No.: US 8,543,349 B2
(45) Date of Patent: Sep. 24, 2013

(54) TEST DEVICE, DISPLAY DEVICE, AND METHOD FOR CHECKING A VALIDITY OF DISPLAY SIGNALS

(75) Inventors: Igor Katchan, Karlsruhe (DE); Markus Lindner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 576 days.

(21) Appl. No.: 12/734,051

(22) PCT Filed: Oct. 9, 2008

(86) PCT No.: PCT/EP2008/063548
§ 371 (c)(1),
(2), (4) Date: Jul. 1, 2010

(87) PCT Pub. No.: WO2009/050106
PCT Pub. Date: Apr. 23, 2009

(65) Prior Publication Data
US 2010/0283858 A1    Nov. 11, 2010

(30) Foreign Application Priority Data
Oct. 10, 2007 (DE) .......................... 10 2007 048 608

(51) Int. Cl.
*G01D 3/00* (2006.01)

(52) U.S. Cl.
CPC ........................................ *G01D 3/00* (2013.01)
USPC ............................................................. 702/108

(58) Field of Classification Search
CPC ........................................................... G01D 3/00
USPC ............................................ 702/108, 182–185
See application file for complete search history.

(56) References Cited

U.S. PATENT DOCUMENTS
6,839,055 B1   1/2005   Nguyen
7,006,117 B1   2/2006   Man
7,467,028 B2 *  12/2008   Pilgrim et al. .................... 701/1

FOREIGN PATENT DOCUMENTS
JP            9-288136           11/1997

* cited by examiner

Primary Examiner — Edward Raymond
(74) Attorney, Agent, or Firm — Kenyon & Kenyon LLP

(57) ABSTRACT

A test device for checking the validity of display signals pertaining to a predefined image includes a device for ascertaining image data from the display signals, device for determining a test value of the image data, and a comparator unit for comparing the ascertained test value with a stored test value pertaining to the image, a validity of the display signals being established in the case where the two test values coincide.

18 Claims, 3 Drawing Sheets

TEST DEVICE, DISPLAY DEVICE, AND METHOD FOR CHECKING A VALIDITY OF DISPLAY SIGNALS

BACKGROUND OF THE INVENTION

1. Field of the Invention

The present invention is directed to a test device, a display device, and a method for checking a validity of display signals.

2. Description of Related Art

A method and a device for checking signals of an LCD interface are known from Japanese Patent Publication JP 09-288136 A Abstract. To check whether the display signal is correct, both the clock signal and the synchronization signals are measured and compared with stored values for these control variables. If they coincide with the stored values, the image signal is considered correct.

BRIEF SUMMARY OF THE INVENTION

The test device according to the present invention has the advantage over the related art that only those data of the display signals are taken into account which are relevant for the image display as such. A check is advantageously performed in a simple manner in that a test value is formed from these image data according to a given formula. The test value for all the image data, for an entire image to be displayed, or for a defined partial area of a total image must result in a test value that may be determined and stored for the image in advance. It is thus possible to check the correctness of the displayed image itself. The check is not instructed to evaluate the additional control signals, but may evaluate the image content itself. The computing complexity may also be kept very low due to the formation of the test value for all the data, for example, via summation or a cyclic redundancy check.

It is thus advantageous that the test device has an interface for transmitting at least one additional test value. Test values for additional images to be tested may thus be transmitted to the test device.

In particular, a display device which has a test device according to the present invention is advantageous. Due to the fact that a test device of this type is provided in a display device, the correctness of image data of the display device may be checked in a simple manner and without great complexity. This is important in particular in a safety-relevant environment in which the display device must always output correct image data. In addition, in particular in the case where an image is generated remotely from the display device, it is made possible, in a simple manner, to check the correctness of the transport of the display signals and thus to also ensure that correct image data are output or, otherwise, a user is given a warning, for example. Accordingly, it is advantageous to provide an interface via which a particular test value of an image shown in the display is transmitted to the test device, which then may compare the calculated test value with the transmitted test value.

To check a data link between the graphic controller and the display, the test device advantageously accesses the data link between the graphic controller and the display device, in particular on the side of the data link facing the display. This makes it possible in particular to also easily detect an overload of a data link.

It is furthermore advantageous to provide, in the display device, a memory module in which at least one test value is stored, for easily providing a test value. This allows the stored test value to be directly used in an initializing mode of the display device and compared with a test value of a test image preferably provided by the display device itself. Furthermore, in the case of an unchanging image, a test value may be stored and compared with a subsequently determined test value for the same image content.

A display device according to the present invention may be advantageously used in a motor vehicle, in particular to display driving-relevant data, in which case a validity check of the display signals according to the present invention ensures that a correct image is output in the display device. A driver may thus be reliably informed about the driving-relevant data of his vehicle.

Similar advantages result for a method according to the present invention for checking a validity of display signals. The test value is advantageously calculated by taking into account the bit value of a pixel associated with a cycle in calculating the test value.

Those image data whose validity has been established due to the enable signal are advantageously evaluated. This ensures that the test value is formed only from valid image data.

The test value is ascertained in a particularly reliable manner by also including a polynomial division in the determination of the test values. The cyclic redundancy check (CRC) is one such method. The CRC method may be applied continuously to the data stream of the image data signals.

Furthermore, it is advantageous in the case of an unchanging image to initially determine and store a test value and to repeat the test value calculation in a subsequent retransmission of the same image. If the image data are valid in both cases, the same test value must always result. If this is not the case, at least in one case there are no valid image data.

DETAILED DESCRIPTION OF THE INVENTION

The test device according to the present invention may be used for checking any display signals. In a first specific embodiment, it may be integrated into a display device to provide information of whether the display signal provided for the display is valid. If the signal is valid, it may be assumed that the display also represents a correct, expected image. Image errors caused by display signals may thus be ruled out. In another specific embodiment, it is, however, also possible to connect the test device only to a source of the display signals, for example, an output of a graphic controller or a data line, which conduct the display signals from a graphic controller. An actually present display unit is then not required for checking the validity of the display signals. In this way, not only the function of the graphic controller, but additionally also the function of the data transmission line for the display signals may be checked. In the following, the present invention is elucidated using the example of a display in a vehicle in which the display signals are checked according to the present invention.

In the present case, "display signal" is to be understood as the totality of those signals which are output by a graphic controller to a display for displaying an image. The display signals are configured for direct reproduction by the display device itself. The display signals thus have both image content, which is present in an RGB data format, for example, and control signals such as, for example, a clock signal, a horizontal synchronization signal, a vertical synchronization signal, and an enable signal. The term "image data" is to be understood as a set of individual digital data values which each specify image values for individual pixels of a display. In the RGB format, this would be a set of data which define a brightness value for the individual colors. These image data are digitally encoded. For example, a pixel is described by an RGB color value composed of three times six bits.

Figure 1:
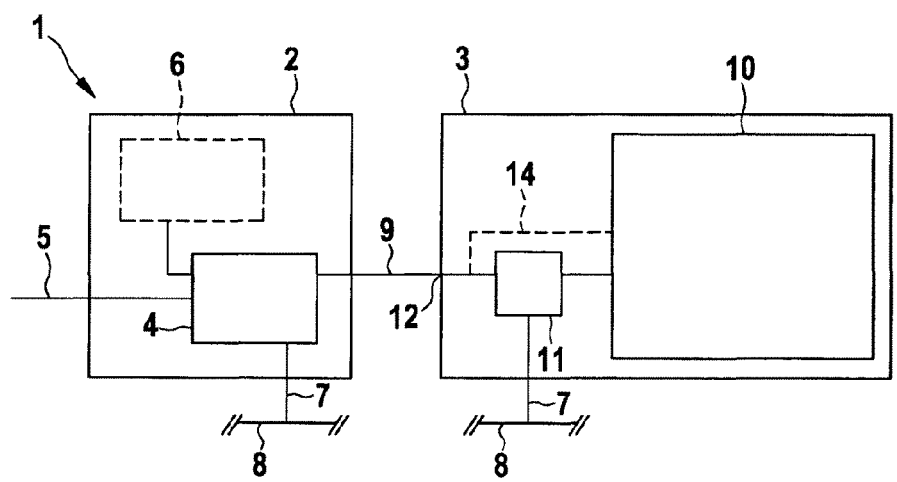
FIG. 1 shows a display device and a test device according to the present invention.

FIG. 1 shows a display device 1, which has a graphic unit 2 and a display unit 3. Graphic unit 2 has a graphic controller 4. In a first specific embodiment, graphic controller 4 processes image information which is supplied to graphic unit 2 via an input 5. In another specific embodiment, graphic unit 2 may also have an arithmetic unit 6, which calculates display signals and relays them to graphic controller 4 for display. In addition, further control information may be relayed from a data bus 8 to graphic controller 4 via a terminal 7. Graphic controller 4 converts the appropriate image data into display signals for display unit 3 according to appropriate specifications adapted to display unit 3. The display signals are adapted, for example, to the number of pixels of display unit 3, for example, 800×600 pixels. The display signals are transmitted from graphic controller 4 to display unit 3 via a preferably multi-wire data line 9. In display unit 3, the display signals are converted directly in display 10. Display 10 is designed, for example, as a liquid crystal display. The image data are written line by line into the display matrix of the liquid crystal display according to the control signals. The lines and the image are wrapped via the control data. The input of the image data is controlled by a clock signal, which is also transmitted via data link 9. In one specific embodiment, it is possible, for example, to have data link 9 designed as an LVDS interface. If errors occur in the LVDS interface, for example, in the event of overload, they may be recognized with the aid of a test device according to the present invention.

In a first example embodiment, test device 11 is connected inside the display device between an input 12 of display unit 3 and display 10. Test device 11 checks the validity of the display signals which are supplied to display unit 3 via input 12. In a first specific embodiment, test device 11 performs this check automatically when display device 1 is switched on. In another specific embodiment, an appropriate request may be given to display unit 3 via a terminal 13 of the display device, also via data bus 8. Furthermore, it is also possible to transmit, to test device 11, via data bus 8 and terminal 13, a test value for the image being output by graphic controller 4 to display unit 3.

In a first example embodiment, the display signals are always passed through test device 11. In another specific embodiment, test device 11 picks up the signals from the connection between input 12 and display 10, so that the display signals are conducted along dashed line 14 directly from input 12 to display 10.

The result of the validity check is output by test device 11. In the specific embodiment shown, the result is output to data bus 8 via terminal 13. The test result is thus available both to graphic unit 2 and to other devices connected to data bus 8. For example, if the display does not work or works incorrectly, a warning device connected to data bus 8, for example, an acoustic signaling device, may output a warning signal to a user of the display.

In one example embodiment, test device 11 may be situated, for example, on a central display of a vehicle, to which image information and control signals are supplied from different image sources.

The display in the vehicle may have a terminal via which test device 11 may be connected, for example, during manufacture in the factory or in the repair shop. Furthermore, test device 11 may also be integrated into the display in the vehicle.

Figure 2:
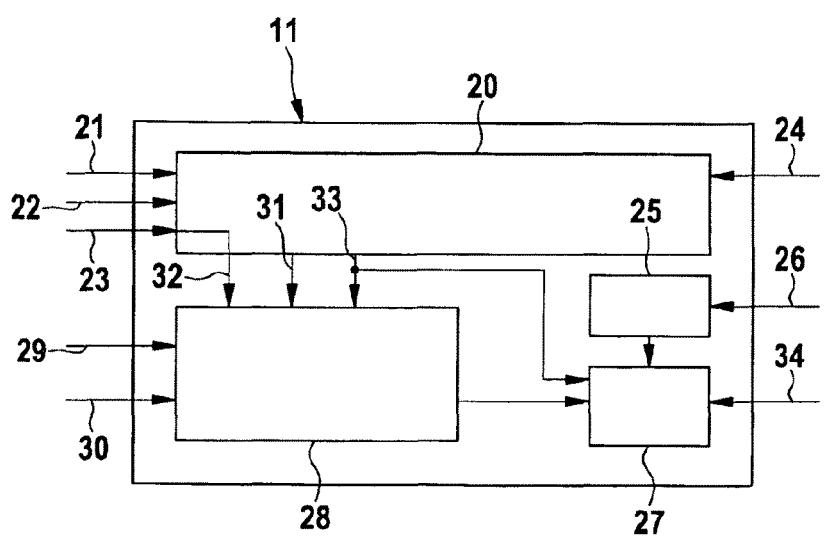
FIG. 2 shows a test device according to the present invention in detail.

FIG. 2 shows the operation of test device 11 in detail. Test device 11, which is implemented, for example, as an FPGA, has a control unit 20, to which the horizontal synchronization signal is supplied via a first input 21, the vertical synchronization signal is supplied via a second input 22, and the enable signal is supplied via a third input 23. Furthermore, control unit 20 has a fourth input 24, which is controlled, for example, from data bus 8 via terminal 13 of display unit 3. A test may be caused to start via fourth input 24. In a first specific embodiment, test device 11 has a memory 25, in which at least one test value for carrying out the validity check of the display signals is stored. In another specific embodiment, at least one further test value may be saved in memory 25 via a fifth input 26. The test value stored in memory 25 is read by a comparator unit 27. In another specific embodiment, a test value may also be relayed directly to a comparator unit 27 via fifth input 26. Fifth input 26 may be designed as a UART, an SBI, or an I2C interface, for example.

In another example embodiment, only one test value of an image may also be calculated and saved in a first step. If immediately thereafter, continuously, or at a later point in time, the same image is transmitted, the test value determination is repeated. If the test value calculated later and the stored test value do not coincide, at least in one case no valid data have been supplied.

Alternatively or in addition, in another example embodiment, memory 25 may also be designed for storing image data of one or more test images which may be read for test value determination.

Furthermore, test device 11 has an arithmetic unit 28, which is used for calculating the test value. For this purpose, the image data are supplied to arithmetic unit 28 via an input 29. Furthermore, the clock signal is also transmitted to arithmetic unit 28 via an input 30. The image data are, for example, RGB data, which have a color depth of 16, 18, or even 24 bits. The RGB data of a pixel are read by arithmetic unit 28 according to a clock signal. However, the data available via input 29 are read only if control unit 20 provides an appropriate start signal via an interface 31. An enable signal that has been set and is conducted from third input 23 via control unit 20 to arithmetic unit 28 via an interface 32 is also required for reading the data. As long as the enable signal is suitably set, image data are incorporated in the test value calculation in arithmetic unit 28 according to a predefined formula. If a transmission of the image is completed, at the latest when vertical synchronization signal 22 is set, a stop signal is output by control unit 20 to arithmetic unit 28 via interface 33. The stop signal is also similarly relayed to comparator unit 27. Comparator unit 27 now reads the calculated test value from arithmetic unit 28. It compares this value with the value saved in memory 25. If the two values coincide, a corresponding signal is output via an output 34 of test device 11. If the two values do not coincide, an error signal is output. In the simplest manner, the signal at output 34 may be set at "high" or "low" as appropriate.

In a first example embodiment, the bit values may be added as the formula for determining the test value. In one specific embodiment, the transmitted data may be simply added up. For this purpose, the data stream is decomposed into packets of a predefined length, for example, 18 bits, and the individual data sets thus obtained are added up. However, more complex formulas are used for determining the test value in order to achieve a higher degree of reliability. It is thus possible, for example, to additionally multiply the individual data blocks obtained by decomposing the data stream by a constant and then to add them up. A particularly reliable recognition is achieved by using a cyclic redundancy test in which a polynomial division is performed instead of a simple addition. In this case, the incoming data are divided by a certain polynomial and the rest of the division is considered as the test value. The CRC32 test algorithm is such a method, for example, which may also be used for a data stream, here a data stream of the valid image data.

In principle, each image may be used for such a test. It is, however, advantageous to provide a predefined test image, which is stored in the display device, for example, for a certain display, and, by requesting a test to be performed, the system may thus test itself without need for operating the display itself. Furthermore, no dedicated video input or output is needed, since the test may be easily integrated into the display device itself.

To ascertain special errors, for example, transmission errors due to a bad voltage supply, special test images may also be used, thus, for example, images having vertical black and white lines in which errors may occur, while in standard test images showing only RGB color variations no errors occur in such cases. In order to thus reliably establish a mode of operation of the display device, not only a single test image, but a sequence of specially provided test images are run through to check the operation of the display device in different load situations.

Figure 3:
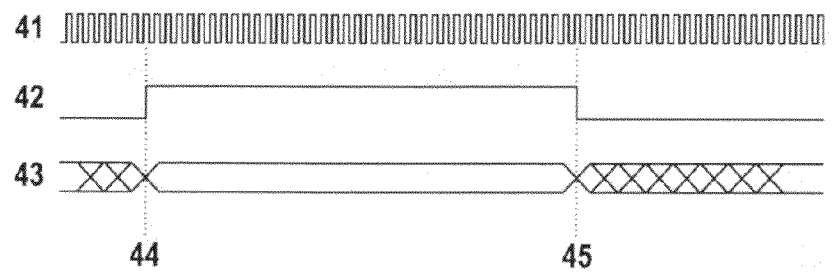
FIG. 3 shows a first representation of display signals for carrying out the method according to the present invention.

FIG. 3 shows an exemplary embodiment of signals during the check by the test device. A first signal 41 is a regular clock signal which defines the reading rate for the image data. Second signal 42 is the enable signal. While it is set at "low," the data are not incorporated in the test value; if it is set at "high," the corresponding image data, namely the digital values of each transmitted pixel, which are represented in third signal 43, are incorporated in the test value calculation according to the predefined test formula. A calculation is thus carried out between first point in time 44 and second point in time 45. Image data possibly transmitted subsequently or previously are not incorporated in the test value determination.

Figure 4:
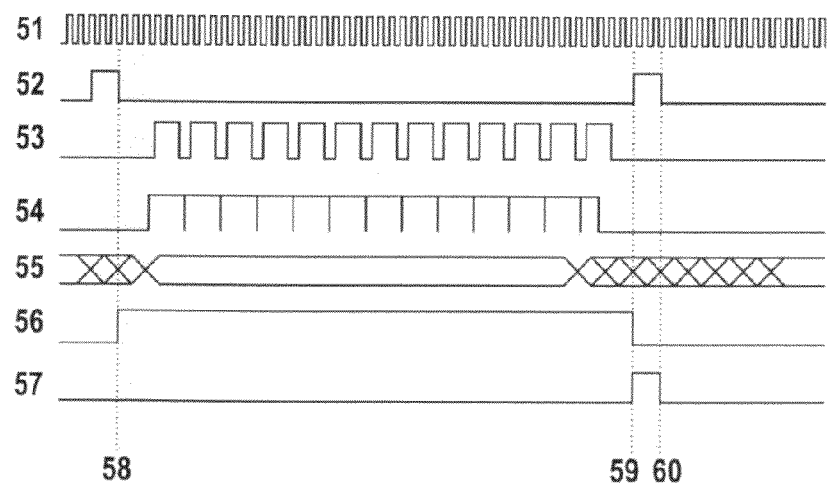
FIG. 4 shows another exemplary embodiment of display signals for carrying out the method according to the present invention.

Another example embodiment in which readout is further refined is illustrated in FIG. 4. The clock signal is again represented in first line 51. The vertical synchronization signal is represented in second line 52 and the horizontal synchronization signal is represented in fourth line 54. Third line 53 here also designates the enable signal. The start signal, which resets the counter at the beginning and subsequently makes it possible to calculate the test value, is represented in sixth line 56. Stop signal 47, which stops the calculation of the test value, is represented in the seventh line. However, in this case the image data are incorporated only if the VSYNC signal, the enable signal, and the HSYNC signal are set. Therefore, data between first point in time 58 and second point in time 59 are not always incorporated in the test value calculation, but only when these three conditions are met. This ensures that all, and preferably only, the useful image data are detected among the display signals and supplied to the test value. After the stop signal is reset at third point in time 60, the next image may be transmitted.

In the example embodiment shown here, all the image data of an image content are detected. However, in another specific embodiment it is also possible to define a certain cutout portion of the image, for example, the upper left corner of the image, using a pixel frame of approximately 100×200 pixels or a cutout image portion in the middle of the image. The validity check may thus be restricted to a smaller portion of the image, which has special image dynamics or a particularly high relevance regarding the displayed contents. A corresponding control signal would have to be provided by the control unit, so that it is checked whether or not a pixel is contained in the target area which is to be checked and thus is to be incorporated in the test value calculation.

Although clock signal 51 is not directly monitored, errors in the clock signal may also be ascertained. If a cycle is omitted or the cycle is not synchronous with the transmitted image signals, this also results in an error in forming the test value, since in that case a value is either not incorporated or incorporated twice in calculating the test value. Errors in the clock signal may thus be detected indirectly in that also such an error results in an erroneous test value.

Figure 5:
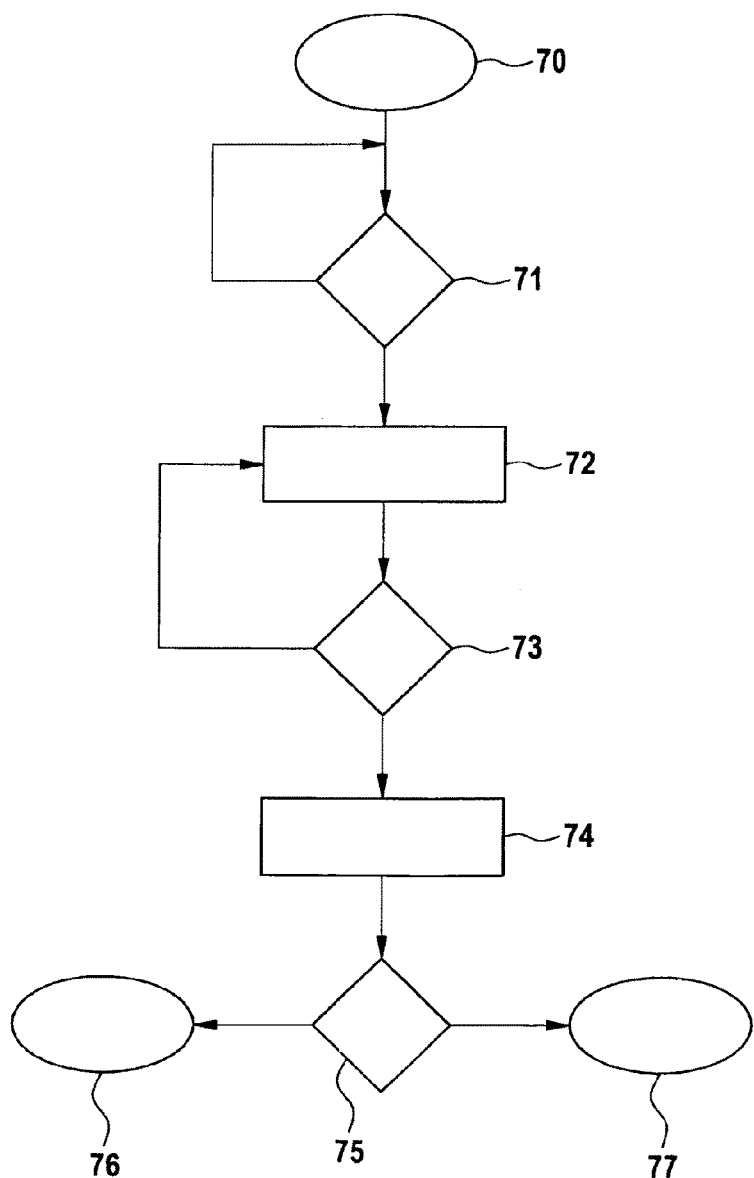
FIG. 5 shows an exemplary embodiment of a method sequence according to the present invention.

FIG. 5 shows a sequence of the method according to the present invention for checking validity. Starting from initialization step 70, a check of the subsequent display signals is initiated. A counter for the test value from the image data is set to zero. In a first check step 71, a check is made as to whether all conditions for the possible presence of valid image data are met. For example, the presence of the enable signal and the correct status of the synchronization signals are checked. If no appropriate conditions are present, it is assumed that no valid image data are being applied to input 29 of test device 11. In this case the program branches back and first test step 71 is performed again. In contrast, if all conditions for valid image data are present, the program branches further to a detection step 72. The image data applied to input 29 are appended to the test value according to the given formula, for example, additively. The program then branches further to a second check step 73. In second check step 73, a check is made as to whether all predefined image frames have been processed. If this is not the case, the program branches back to detection step 72 and the next image data set predefined by the clock signal is read and incorporated in the test value calculation. If the end of the predefined image frame is reached, the program branches further to comparison step 74, in which comparator unit 27 compares the calculated test value with the predefined test value. The program then branches further to a third check step 75. If both values coincide, valid image data are present, and the program branches further to an end step 76, in which the validity is confirmed and test device 11 outputs a corresponding signal. If the calculated test value does not coincide with the stored test value, the program branches further to an end step 77, in which, however, test device 11 outputs an error signal.

What is claimed is:

1. A test device for checking the validity of display signals corresponding to a predefined image, comprising:
  at least one device configured to:
    evaluate a status of an enable signal;
    ascertain image data from the display signals based on the evaluated status of the enable signal;
    determine a test value from the ascertained image data;
    compare the determined test value with a stored test value corresponding to the image data; and determine that the display signals are valid conditional upon that the determined test value is determined by the comparison to match the stored test value.

2. The test device as recited in claim 1, further comprising:
an interface configured to transmit at least one further test value pertaining to at least one additional image.

3. The test device as recited in claim 1, wherein the test device is a component of a display device that includes:
a display for displaying images; and
a graphic controller for generating display signals used for generating an image on the display, the display signals from which the image data is ascertained being generated by the graphics controller.

4. The test device as recited in claim 3, wherein the display device further comprises an interface configured to transmit to the test device the test value.

5. The test device as recited in claim 4, wherein:
the display device further comprises a data link between the graphic controller and the display; and
the test device accesses the display signals between the data link and the display.

6. The test device as recited in claim 4, wherein:
the display device further comprises a memory storing image data of at least one test image and at least one test value corresponding to the at least one test image.

7. The test device as recited in claim 4, wherein the display device is located in a motor vehicle.

8. The test device as recited in claim 3, wherein the determination of the test value includes selecting bit values from display signals in accordance with a predefined clock cycle.

9. The test device as recited in claim 3, wherein the determination of the test value includes a polynomial division.

10. The test device as recited in claim 3, wherein the stored test value is determined from ascertained image data of the predefined image.

11. The test device as recited in claim 1, wherein the determination of the test value includes selecting bit values from display signals in accordance with a predefined clock cycle.

12. The test device as recited in claim 1, wherein the determination of the test value includes a polynomial division.

13. The test device as recited in claim 1, wherein the stored test value is determined from ascertained image data of the predefined image.

14. A method for checking a validity of display signals generated from image data of a predefined image, comprising:
evaluating, by a processing circuit, a status of an enable signal;
ascertaining, by the processing circuit, image data from the display signals based on the evaluated status of the enable signal;
determining, by the processing circuit, a test value from the ascertained image data;
comparing, by the processing circuit, the determined test value with a stored test value corresponding to the image data; and
determining, by the processing circuit, that the display signals are valid conditional upon that the determined test value is determined by the comparison to match the stored test value.

15. A method for checking a validity of display signals generated from image data of a predefined image, comprising:
ascertaining, by the processing circuit, image data from the display signals;
generating, by the processing circuit, a test value corresponding to the ascertained image data, wherein the generating includes at least one of:
selecting bit values from display signals in accordance with a predefined clock cycle; and
a polynomial division;
comparing, by the processing circuit, the determined test value with a stored test value corresponding to the image data; and
determining, by the processing circuit, that the display signals are valid conditional upon that the determined test value is determined by the comparison to match the stored test value.

16. The method as recited in claim 15, wherein the generating includes the selecting of the bit values in accordance with the predefined clock cycle.

17. The method as recited in claim 15, wherein the generating includes the polynomial division.

18. A method for checking a validity of display signals generated from image data of a predefined image, comprising:
ascertaining, by the processing circuit, image data from the display signals;
determining, by the processing circuit, a test value from the ascertained image data;
comparing, by the processing circuit, the determined test value with a stored test value that is determined from ascertained image data of the predefined image; and
determining, by the processing circuit, that the display signals are valid conditional upon that the determined test value is determined by the comparison to match the stored test value.

* * * * *

UNITED STATES PATENT AND TRADEMARK OFFICE
CERTIFICATE OF CORRECTION

PATENT NO.         : 8,543,349 B2
APPLICATION NO. : 12/734051
DATED              : September 24, 2013
INVENTOR(S)        : Katchan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this

Fifteenth Day of September, 2015

Michelle K. Lee
*Director of the United States Patent and Trademark Office*